US012742246B2

(12) United States Patent
Deng et al.

(10) Patent No.: US 12,742,246 B2
(45) Date of Patent: Sep. 22, 2026

(54) PORTABLE HYDROGEN-OXYGEN GENERATOR

(71) Applicants: DALIAN INSTITUTE OF CHEMICAL PHYSICS, CHINESE ACADEMY OF SCIENCES, Dalian (CN); JINKAI INSTRUMENT (DALIAN) CO., LTD, Dalian (CN)

(72) Inventors: Dehui Deng, Dalian (CN); Yanting Liu, Dalian (CN); Xiao Yang, Dalian (CN); Jinchang Fan, Dalian (CN); Qiang Zhao, Dalian (CN); Xiaoqi Zhao, Dalian (CN)

(73) Assignees: DALIAN INSTITUTE OF CHEMICAL PHYSICS, CHINESE ACADEMY OF SCIENCES, Dalian (CN); JINKAI INSTRUMENT (DALIAN) CO., LTD, Dalian (CN)

( * ) Notice: Subject to any disclaimer, the term of this patent is extended or adjusted under 35 U.S.C. 154(b) by 966 days.

(21) Appl. No.: 17/997,457

(22) PCT Filed: Jun. 12, 2020

(86) PCT No.: PCT/CN2020/095727
§ 371 (c)(1),
(2) Date: Jan. 19, 2023

(87) PCT Pub. No.: WO2021/217798
PCT Pub. Date: Nov. 4, 2021

(65) Prior Publication Data

US 2023/0175147 A1 Jun. 8, 2023

(30) Foreign Application Priority Data

Apr. 29, 2020 (CN) ......................... 202020691315.6
Apr. 29, 2020 (CN) ......................... 202020692679.6

(51) Int. Cl.
*C25B 9/01* (2021.01)
*C25B 1/04* (2021.01)
(Continued)

(52) U.S. Cl.
CPC .................. *C25B 9/01* (2021.01); *C25B 1/04* (2013.01); *C25B 9/65* (2021.01); *C25B 9/67* (2021.01);
(Continued)

(58) Field of Classification Search
CPC ................ C25B 1/04; C25B 9/01; C25B 9/65
See application file for complete search history.

(56) References Cited

U.S. PATENT DOCUMENTS

2010/0089746 A1* 4/2010 Chang ................... C25B 11/036 204/278.5
2012/0231358 A1* 9/2012 Akiyama .......... H01M 8/04186 429/434
(Continued)

FOREIGN PATENT DOCUMENTS

CN 201095650 Y 8/2008
CN 106115867 A * 11/2016 ................ C02F 1/42
(Continued)

*Primary Examiner* — Ciel P Contreras
(74) *Attorney, Agent, or Firm* — NKL Law; Allen Xue

(57) ABSTRACT

A portable hydrogen-oxygen generator includes a housing having a detachable upper cover and a bottom cover. An electrolytic cell module is arranged in the housing. The electrolytic cell module has a hydrogen generation chamber and an oxygen generation chamber. A cathode electrode plate and an anode electrode plate are respectively arranged in the hydrogen generation chamber and the oxygen generation chamber, and the bottoms of the two generation chambers are communicated for electrolyte circulation. A hydrogen outlet part and an oxygen outlet part detachably arranged on the upper cover and respectively corresponding to the hydrogen generation chamber and the oxygen gen-
(Continued)

eration chamber. A filtering film for removing water is arranged between the hydrogen/oxygen outlet part and the electrolytic cell module. A power supply module is arranged on the bottom cover of the housing to supply electric energy to the cathode electrode plate and the anode electrode plate.

7 Claims, 4 Drawing Sheets

(51) Int. Cl.

| | |
|---|---|
| ***C25B 9/65*** | (2021.01) |
| ***C25B 9/67*** | (2021.01) |
| ***C25B 15/025*** | (2021.01) |
| ***C25B 15/08*** | (2006.01) |
| ***H01M 50/247*** | (2021.01) |
| ***H01M 50/284*** | (2021.01) |
| ***H01M 50/298*** | (2021.01) |

(52) U.S. Cl.
CPC ............ *C25B 15/025* (2021.01); *C25B 15/08* (2013.01); *C25B 15/085* (2021.01); *H01M 50/247* (2021.01); *H01M 50/284* (2021.01); *H01M 50/298* (2021.01); *H01M 2220/30* (2013.01)

(56) References Cited

U.S. PATENT DOCUMENTS

| | | | | |
|---|---|---|---|---|
| 2020/0138100 | A1* | 5/2020 | Takehara | ................ A24F 40/30 |
| 2021/0060282 | A1* | 3/2021 | Takehara | .............. A61M 15/06 |

FOREIGN PATENT DOCUMENTS

| | | | | | |
|---|---|---|---|---|---|
| CN | 206858668 | U | | 1/2018 | |
| CN | 108714261 | A | | 10/2018 | |
| CN | 108879848 | A | * | 11/2018 | ............ H02J 7/0044 |
| CN | 208933487 | U | | 6/2019 | |
| KR | 101795735 | B1 | * | 11/2017 | ............ A61M 16/06 |
| WO | 2004020701 | A2 | | 3/2004 | |

* cited by examiner

PORTABLE HYDROGEN-OXYGEN GENERATOR

TECHNICAL FIELD

The present invention relates to the technical field of preparing hydrogen and oxygen, in particular to a portable hydrogen-oxygen generator.

BACKGROUND

In terms of electrochemical principle, hydrogen and oxygen can be prepared by electrolysis of water, which is widely used in the fields of electronics, machinery and chemical engineering. Meanwhile, electrolysis of water can also directly produce oxyhydrogen suitable for human inhalation (H2/O2: 66.6%/33.3%), which is widely used in hydrogen medicine. However, the existing hydrogen and oxygen generation instrument is large in volume and weight, and high in price, which is only suitable for use in specific medical institutions. In the face of growing family demand and portability demand, the miniaturization and lightweight of the hydrogen and oxygen generation instrument have become urgent problems to be solved.

Therefore, based on the portability demand, it is necessary to develop a portable hydrogen-oxygen generator with a purpose of low cost, safety, reliability and rapid promotion.

SUMMARY OF THE INVENTION

In order to solve the above technical problems, the present invention provides a portable hydrogen-oxygen generator. According to electrochemical principle of electrolysis of water, the present invention produces hydrogen, oxygen and oxyhydrogen by setting an electrolytic cell module having a hydrogen generation chamber and an oxygen generation chamber operating independently, having the characteristics of gas selectivity, low energy consumption, low cost, safety and noise free.

Technical solutions adopted by the present invention are as follows:

A portable hydrogen-oxygen generator, includes:

a housing having a hollow columnar structure with a holding space, where the housing is provided with a detachable upper cover at an upper end, is snapped with a bottom cover at an bottom, and internally provided with a partition for separating an electrolytic cell module and a power supply module;

the electrolytic cell module arranged in the housing for storing an electrolyte and having a hydrogen generation chamber and an oxygen generation chamber which are mutually independent, where a cathode electrode plate and an anode electrode plate are respectively arranged in the hydrogen generation chamber and the oxygen generation chamber, and the bottoms of the two generation chambers are communicated for electrolyte circulation;

a hydrogen outlet part and an oxygen outlet part detachably arranged on the upper cover and respectively corresponding to the hydrogen generation chamber and the oxygen generation chamber, where a filtering film for removing water is also arranged between the hydrogen/oxygen outlet part and the electrolytic cell module; and the power supply module arranged on the bottom cover of the housing to supply electric energy for the cathode electrode plate and the anode electrode plate.

Further, the portable hydrogen-oxygen generator is also provided with a liquid level sensor, where a control component thereof is arranged on the bottom cover and a probe thereof is arranged in the electrolytic cell module.

Further, when the electrolyte reaches a low liquid level, a buzzer sounds to remind a liquid to add electrolyte, where the electrolyte is added by unscrewing a cover of the hydrogen outlet part or the oxygen outlet part; and when the electrolyte reaches a high liquid level, the buzzer sounds to remind to stop adding electrolyte.

Further, a lower end of the hydrogen/oxygen outlet part is welded with the filtering film, and a sealing gasket for sealing is arranged between the hydrogen/oxygen outlet and an opening of the upper cover.

Further, the hydrogen generation chamber and the oxygen generation chamber are separated by a chamber partition I vertically arranged in the housing, and a bottom of the chamber partition I has a gap from a surface of the partition to communicate the two generation chambers and flow the electrolyte.

Further, the hydrogen generation chamber and the oxygen generation chamber are formed by an extension part arranged at the lower end of the upper cover, where the extension part is inserted into the housing and has two chambers. The extension part is arranged at the lower end of the upper cover and has a holding space matching the housing. The two chambers of the extension part are separated by a chamber partition II vertically arranged inside. A bottom of the chamber partition II has a gap from a surface of the partition to communicate the two generation chambers and flow the electrolyte flow.

Further, an edge of the upper cover is provided with a plurality of bulges matching with location holes arranged at an upper end of inner wall of the housing to clamp and fix the electrolytic cell module.

Further, the cathode electrode plate and the anode electrode plate are provided with hole-shaped electrode cover plates to prevent the electrodes from swinging.

Further, the cathode electrode plate and the anode electrode plate are respectively fixed on the bottom cover at the bottom of the housing through screw robs, and are connected with a circuit board of the power supply module through electric wires. The screw rob, successively passing through the gasket, a first screw for fixing the electrode, a binding post, and a second screw for fixing the binding post, is fixed in a fixing hole of the bottom cover.

Further, the bottom cover is provided with heat emission holes, and the bottom of the bottom cover is provided with suction cups for preventing shaking.

The present invention discloses another portable hydrogen-oxygen generator, including:

a housing having a hollow barrel structure, where the housing has an open upper opening and is snapped with a bottom cover at an bottom, to hold and install an electrolytic cell module and an power supply module;

the electrolytic cell module arranged in the housing for storing an electrolyte and having a hydrogen generation chamber and an oxygen generation chamber which are mutually independent, where a cathode electrode plate and an anode electrode plate are respectively arranged in the hydrogen generation chamber and the oxygen generation chamber, and the bottoms of the two generation chambers are communicated with a channel for electrolyte circulation;

a hydrogen outlet part and an oxygen outlet part detachably arranged on the upper cover of the electrolytic cell and respectively corresponding to the hydrogen generation chamber and the oxygen generation chamber, where a filtering film for removing water is arranged between the hydrogen/oxygen outlet part and the electrolytic cell module; and the power supply module arranged on the bottom cover of the housing to supply electric energy for the cathode electrode plate and the anode electrode plate.

Further, the portable hydrogen-oxygen generator is provided with a liquid level sensor, where a control component thereof is arranged on the bottom cover and a probe thereof is arranged in the electrolytic cell module.

Further, when the electrolyte reaches a low liquid level, a buzzer sounds to remind to add electrolyte, where the electrolyte is added by unscrewing a cover of the hydrogen outlet part or the oxygen outlet part; and when the electrolyte reaches a high liquid level, the buzzer sounds to remind to stop adding electrolyte.

Further, a lower end of the hydrogen/oxygen outlet part is welded with the filtering film, and a sealing gasket for sealing is arranged between the hydrogen/oxygen outlet and an opening of the upper cover of the electrolytic cell module.

Further, the electrolytic cell module is arranged in the housing, and an edge of the upper cover is provided with a plurality of bulges matching with location holes arranged at an upper end of inner wall of the housing to clamp and fix the electrolytic cell module.

Further, the cathode electrode plate and the anode electrode plate are provided with hole-shaped electrode cover plates to prevent the electrodes from swinging. The electrode cover plate is clamped and fixed on the bottom plate of the electrolytic cell module.

Further, the cathode electrode plate and the anode electrode plate are respectively fixed on the bottom cover at the bottom of the housing through screw robs, and are connected with a circuit board of the power supply module through electric wires.

Further, the screw rob, successively passing through the gasket, a first screw for fixing the electrode, a binding post, and a second screw for fixing the binding post, is fixed in a fixing hole of the bottom cover.

Further, the bottom cover is provided with heat emission holes.

Further, a bottom of the bottom cover is also provided with suction cups for preventing shaking.

Compared with the prior art, the present invention provides a portable hydrogen-oxygen generator including a housing, where the housing is provided with an electrolytic cell module and a power supply module. Electrolyte is stored in the electrolytic cell module which is provided with a liquid level sensor. When the electrolyte reaches a low liquid level, the buzzer sounds to remind to add electrolyte; when the electrolyte reaches a high liquid level, the buzzer sounds to remind to stop adding electrolyte. The electrolytic cell module is provided with a cathode electrode plate and an anode electrode plate, and the two electrode plates are separated by two chambers. The electrolyte freely flows through the channel at the bottom of the chambers. The upper part of the chamber containing the anode electrode plate is provided with a detachable oxygen outlet part, and the upper part of the chamber containing the cathode electrode plate is provided with a detachable hydrogen outlet part. The detachable hydrogen/oxygen outlet is provided with a filtering film to remove water in hydrogen and oxygen, and to condense water vapor and return it to the electrolytic cell module for reuse.

The present invention uses water as the reaction raw material, and the cheap, safe and non-toxic inorganic salt as the electrolyte to directly generate normobaric pure hydrogen (>99%), pure oxygen (>99%) or hydrogen oxygen mixture (H2/O2: 66.6%/33.3%). The present invention is ready for use and has high safety.

The present invention has advantages of small volume, small weight, gas selectivity, low energy consumption, low cost, safety, noise free and simple structure, and is portable.

DETAILED DESCRIPTION OF DRAWINGS

In order to more clearly illustrate technical solutions in the embodiments of the present disclosure or in the prior art, a brief introduction to the accompanying drawings required for the description of the embodiments or the prior art will be provided below. Obviously, the accompanying drawings in the following description are some of the embodiments of the present disclosure, and those ordinary skilled in the art would also be able to derive other drawings from these drawings without making creative efforts.

Figure 1:
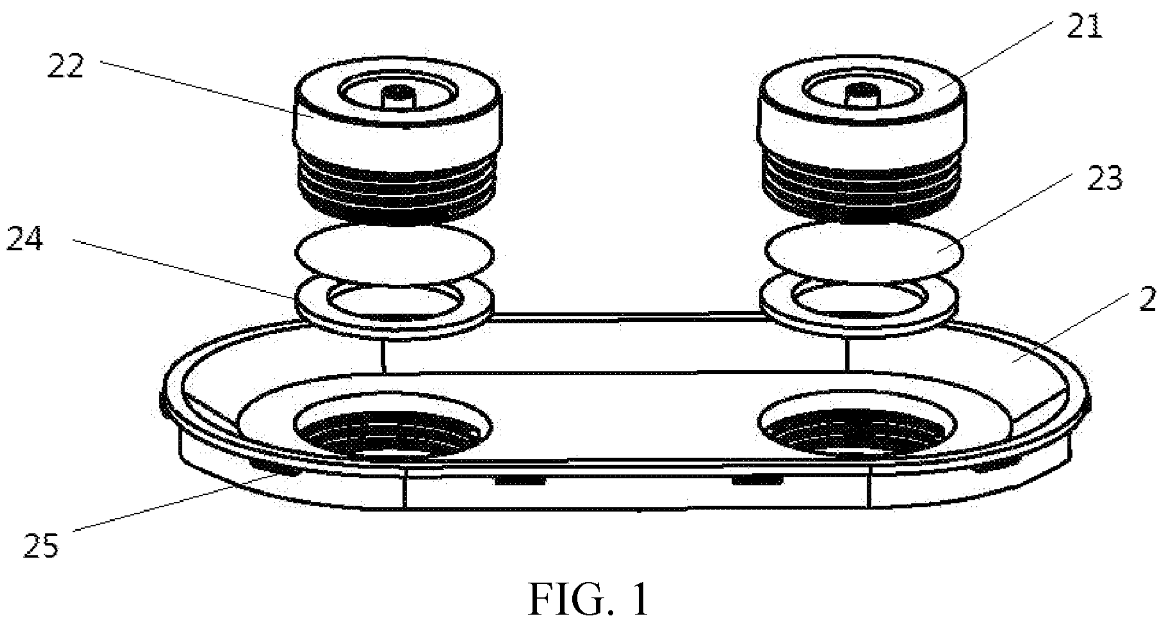
FIG. 1 is a structural diagram of the upper cover, the hydrogen outlet part and the oxygen outlet part of a portable hydrogen-oxygen generator of the present invention.

In the figures, 1. housing; 11. chamber partition I; 12. location hole; 13. bottom cover; 14. suction cup; 15. heat emission hole; 16. liquid lever senor; 17. screw rob fixing hole; 18. bottom cover fixing hole; 2. upper cover; 21. hydrogen outlet part; 22. oxygen outlet part; 23. filtering film; 24. sealing gasket; 25. bulge; 26. extension part; 27. chamber partitionII; 28. main body of electrolytic cell module; 3. electrode plate; 31. electrode cover plate; 32. screw rob; 33. snap; 34. gasket; 35. first screw; 36. binding post; 37. second screw; 4. power supply module; 41. control part; 42. circuit board; 43. battery pack.

DETAILED DESCRIPTION OF PREFERRED EMBODIMENTS

It should be noted that, in the case of no conflicts, the embodiments and the features in the embodiments of the present invention can be combined mutually. The present invention will be described in detail below with reference to the accompanying drawings and the embodiments.

To make the objectives, technical solutions and advantages of embodiments of the present disclosure more obvious, the technical solutions of the present disclosure will be clearly and completely described below in conjunction with the accompanying drawings in the embodiments of the present disclosure, and obviously, the described embodiments are some, rather than all of the embodiments of the present disclosure. The following description of at least one example embodiment is merely illustrative in nature, and is in no way intended to limit the present disclosure, an application or use thereof. Based on the embodiments of the present disclosure, all other embodiments acquired by those ordinary skilled in the art without making creative efforts fall within the scope of protection of the present disclosure.

It should be noted that the terms used herein are only intended to describe specific embodiments and are not intended to limit the example embodiments of the present disclosure. As used herein, unless indicated obviously in the context, a singular form is also intended to include a plural form. In addition, it should also be understood that the terms "include" and/or "comprise" used in this specification indicate features, steps, operations, devices, components and/or their combinations.

Except as otherwise specifically set forth, the relative arrangement of components and steps, numerical expressions and numerical values set forth in these embodiments do not limit the scope of the present invention. In addition, it should be clear that, for ease of description, sizes of the various components shown in the accompanying drawings are not drawn according to actual proportional relationships. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely example rather than limiting. Therefore, other examples of the example embodiments may have different values. It should be noted that similar reference signs and letters represent similar items in the accompanying drawings below. Therefore, once an item is defined in one accompanying drawing, the item does not need to be further discussed in a subsequent accompanying drawing.

In the description of the present invention, it should be noted that orientations or position relationships indicated by orientation terms "front, rear, upper, lower, left, and right", "transverse, vertical, perpendicular, and horizontal", "top and bottom", and the like are usually based on orientations or position relationships shown in the accompanying drawings, and these terms are only used to facilitate description of the present invention and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present invention: orientation words "inner and outer" refer to the inside and outside relative to the contour of each component.

For ease of description, spatially relative terms such as "on", "over", "on the upper surface", and "above" can be used here, to describe a spatial positional relationship between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" is then be positioned as being "below another device or structure" or "beneath a device or structure". Therefore, the exemplary term "above" can include both orientations "above" and "below". The device can also be positioned in other different ways (rotating by 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present invention.

Figure 3:
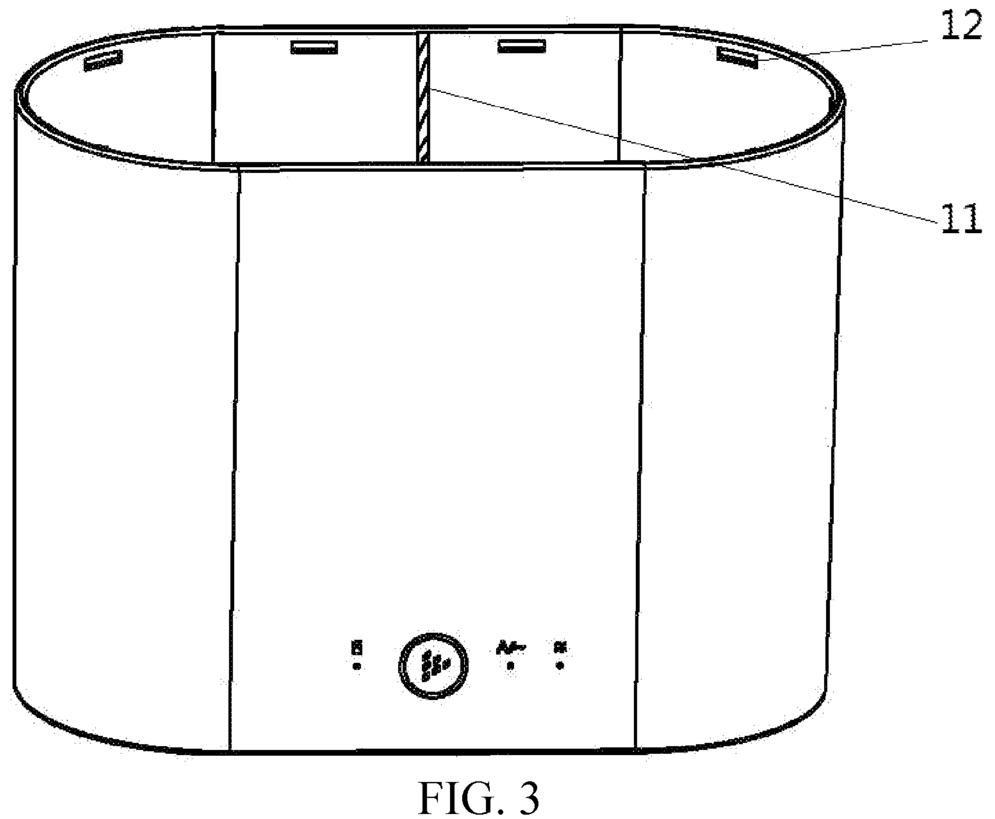
FIG. 3 is a structural diagram of the housing of a portable hydrogen-oxygen generator of the present invention.
Figure 5:
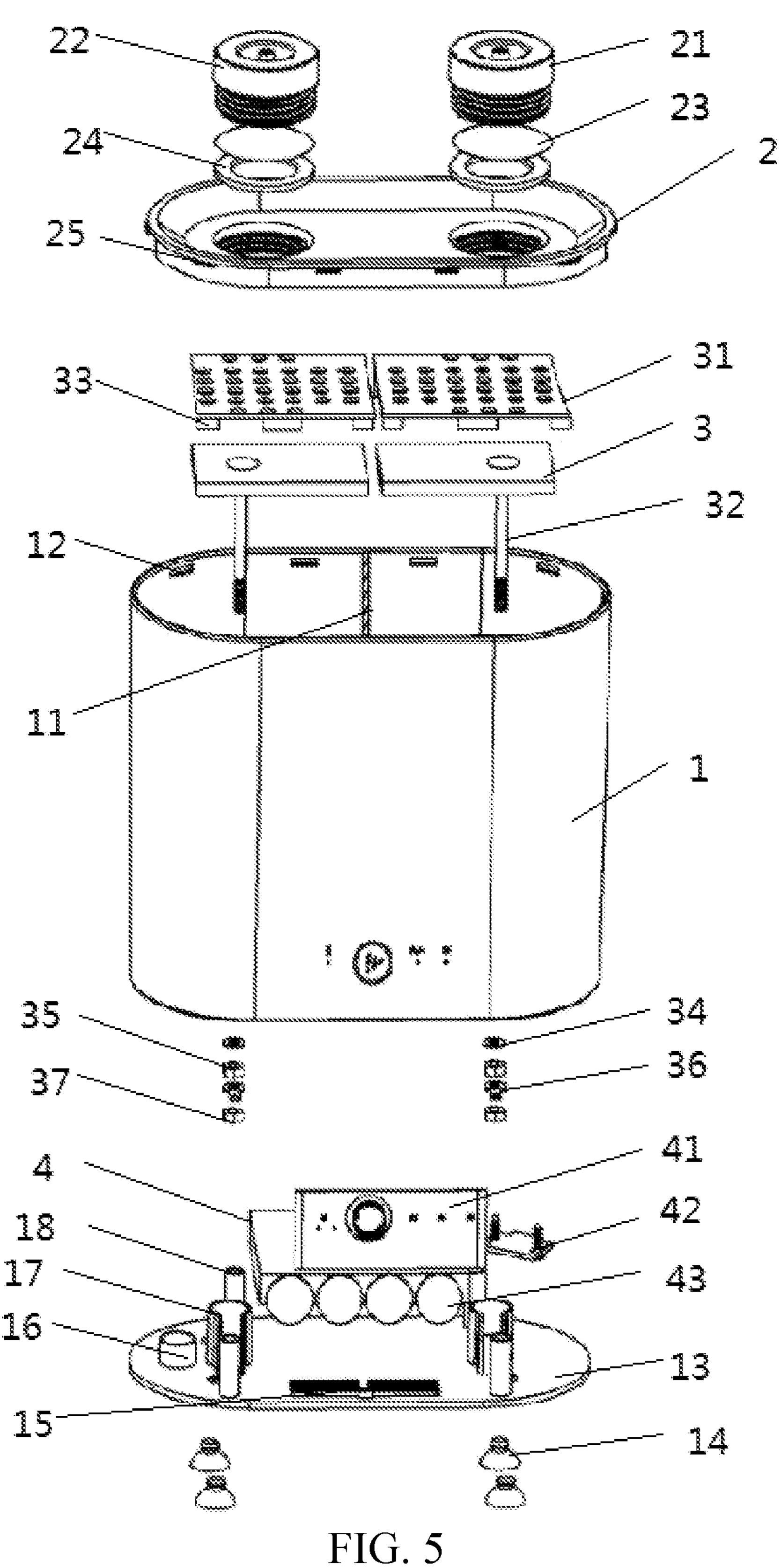
FIG. 5 is an overall exploded structural diagram of a portable hydrogen-oxygen generator of the present invention.

As shown in FIG. 5, the present invention provides a portable hydrogen-oxygen generator as follows:

A housing 1 has a hollow columnar structure with a holding space, as shown in FIG. 3. The cross section of the housing may be long circle, rectangular or other shapes, as long as the housing has a hollow structure. The upper end of the housing is provided with a detachable upper cover 2, and the edge of the upper cover 2 is provided with a plurality of bulges 25 matching with the location holes 12 at arranged the upper end of the inner wall of the housing 1 to clamp and fix the electrolytic cell module. In order to make the outer side of the housing aesthetic, the location hole 11 may be set as a blind hole opened towards the hollow part of the housing. The bottom of housing 1 may be snapped with the bottom cover 13. The housing 1 is internally provided with a partition for separating the electrolytic cell module and the power supply module 4 (not shown in the figure, it may be understood that the partition plays a role of separating the electrolytic cell module and the power supply module, and the position of the partition may be reasonably set according to the space occupied by the two modules).

The electrolytic cell module is arranged in the housing 1, that is, the upper cover 2 is snapped with the housing 1, and combined with the partition in the housing 1 to form a space for storing electrolyte, where the space has a hydrogen generation chamber and an oxygen generation chamber which are mutually independent. The electrode plates 3 (including cathode electrode plate and anode electrode plate, which are distributed on right and left in the figure) are respectively arranged in the hydrogen generation chamber and the oxygen generation chamber. The bottoms of the two generation chambers are communicated for electrolyte circulation. As a preferred solution, a plurality of grooves can be arranged on the partition as the channels for electrolyte circulation.

As shown in FIG. 1, the hydrogen outlet part 21 and the oxygen outlet part 22 are detachably arranged on the upper cover 2 and respectively corresponding to the hydrogen generation chamber and the oxygen generation chamber, where the detachable way may be thread rotation connection, expanded connection, or other pluggable ways and the like. A filtering film 23 for removing water is also arranged between the hydrogen/oxygen outlet part and the electrolytic cell module. The filtering film 23 is welded at the lower end of the hydrogen/oxygen outlet part, and a sealing gasket 24 for sealing is also arranged between the hydrogen/oxygen outlet part and the opening of the upper cover 2.

Figure 2:
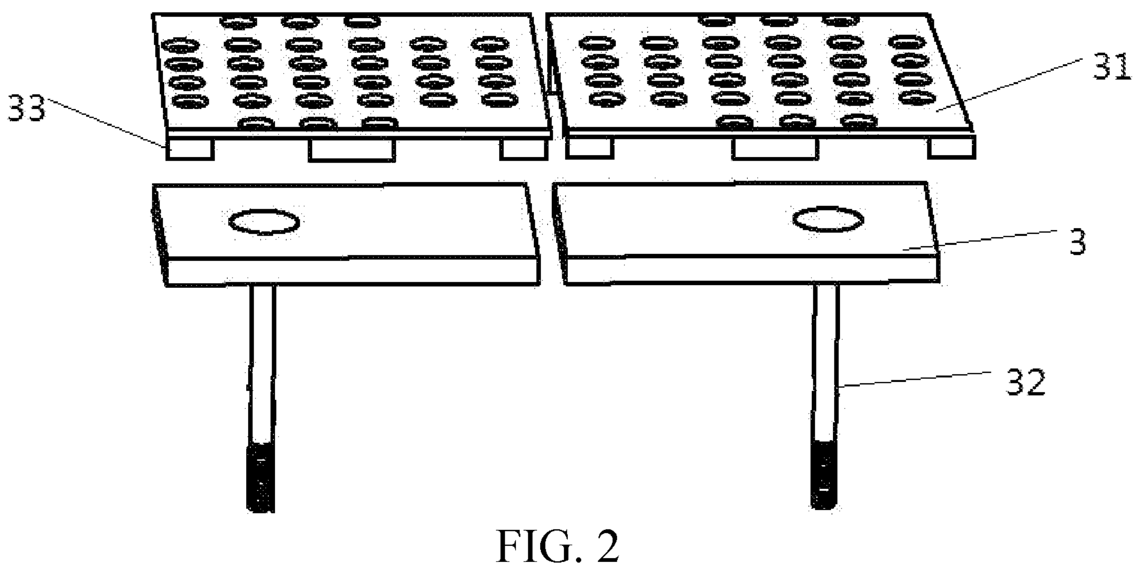
FIG. 2 is a structural diagram of the electrode plates and the electrode cover plates of a portable hydrogen-oxygen generator of the present invention.

As shown in FIG. 2, the cathode electrode plate and the anode electrode plate are also provided with hole-shaped electrode cover plates 31 to prevent the electrodes from swinging. The electrode cover plate 31 is clamped and fixed with the matching structure protruding from the partition through the snaps 33 at its side.

The cathode electrode plate and the anode electrode plate are respectively fixed on the bottom cover 13 at the bottom of the housing 1 through screw rods 32. The screw rod 32 first passes through the partition, and is connected with the circuit board 42 of the power supply module 4 through electric wires. The screw rod, successively passing through the gasket 34, the first screw 35 for fixing the electrode, the binding post 36, and the second screw 37 for fixing the binding post 36, is fixed in the screw rod fixing hole 17 of the bottom cover 13. When snapped with the housing 1, the bottom cover 13 may be further tightened through the bottom cover fixing hole 18. The binding post 36 is electrically connected with the circuit board 42 of the power supply module 4 through electric wires.

The power supply module 4 is arranged on the bottom cover 13 of the housing 1 to supply electric energy for the cathode electrode plate and the anode electrode plate, where the power supply module 4 include a control part 41, a circuit board 42 and a battery pack 43. The control part 41 can control the on-off of the generator and other conventional adjustment operations. The portable hydrogen-oxygen generator is also provided with a liquid level sensor 16. A control component of the liquid level sensor 16 is arranged on the bottom cover 13, and a probe of that is arranged in the electrolytic cell module. When the electrolyte reaches a low liquid level, a buzzer sounds to remind to add electrolyte, where the electrolyte is added by unscrewing a cover of the hydrogen outlet part 21 or the oxygen outlet part 22. When the electrolyte reaches a high liquid level, the buzzer sounds to remind to stop adding electrolyte. The bottom cover 13 is also provided with heat emission holes 15, and the bottom of the bottom cover 13 is also provided with suction cups 14 for preventing shaking.

Embodiment 1

As shown in FIG. 3, on the basis of the above main structure, the hydrogen generation chamber and the oxygen generation chamber in the electrolytic cell module are separated by the chamber partition I 11 vertically arranged in the housing. The upper cover 2 is snapped with the upper end of the housing 1 having the partition I 11, and combined together with the partition in the housing 1 to form the main chambers of the electrolytic cell module. The electrode plates 3 are arranged in the chambers and the electrolyte is also filled in the chambers. A sealing component is arranged at the snap joint of the upper cover 2 and the housing 1 to prevent electrolyte leakage. Further preferably, in view of the stability of the electrode plate, a support mechanism may be arranged at the lower part of the electrode plate. The bottom of the chamber partition I 11 has a gap from the surface of the partition to communicate the two generation chambers and flow the electrolyte. As long as the bottoms of the two chambers are communicated to ensure that there are reaction chambers independent with each other, so that single oxygen or hydrogen may be prepared in each chamber.

Embodiment 2

Figure 4:
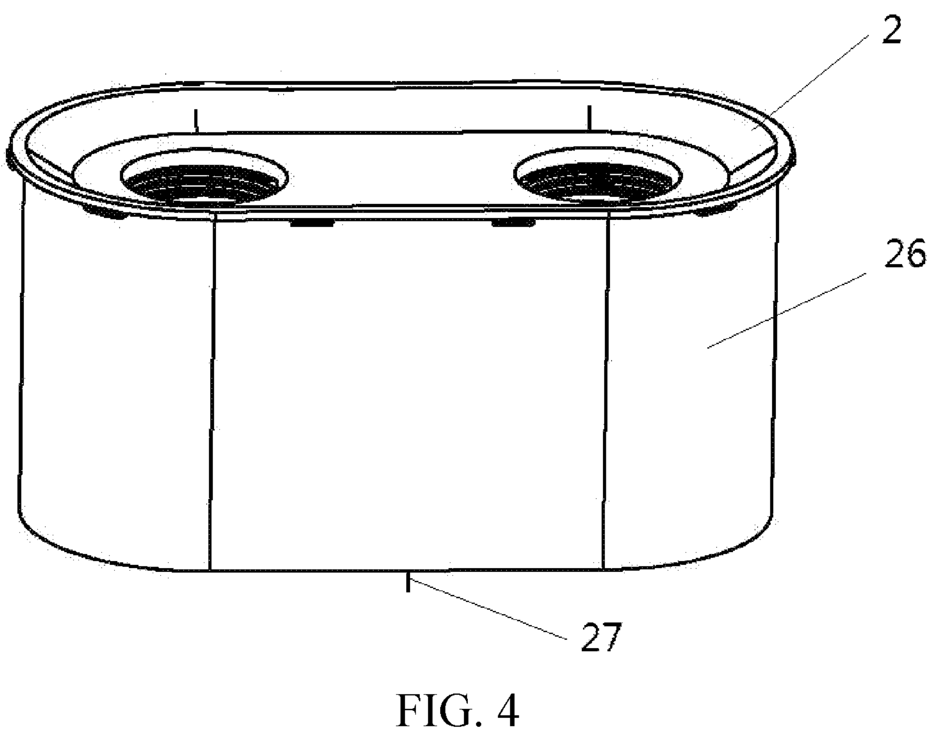
FIG. 4 is a structural diagram of the upper cover with an extension part of a portable hydrogen-oxygen generator of the present invention.

As shown in FIG. 4, on the basis of the above main structure, the form of the upper cover 2 may be changed. The lower end of the upper cover 2 is provided with an extension part 26 having a holding space. The purpose of setting the extension part 26 is to form the main chambers of the electrolytic cell module by combining the extension part 26 with the housing 1, that is, the hydrogen generation chamber and the oxygen generation chamber are formed by the extension part 26 arranged at the lower end of the upper cover 2, inserted into the housing 1 and having two chambers. The two chambers of the extension part 26 are separated by the chamber partition II 27 vertically arranged inside the chamber. When in use, the upper cover 2 having the extension part 26 is inserted into the housing 1, and is basically gapless fit with the housing 1. A sealing component is arranged at the snap joint of the upper cover 2 and the housing 1 to prevent electrolyte leakage. The bottom of the chamber partition II 27 has a gap from the surface of the partition to communicate the two generation chambers and flow the electrolyte. As long as the bottoms of the two chambers are communicated to ensure that there are independent reaction chambers independent with each other, so that single oxygen or hydrogen may be prepared in each chamber.

Embodiment 3

Figure 6:
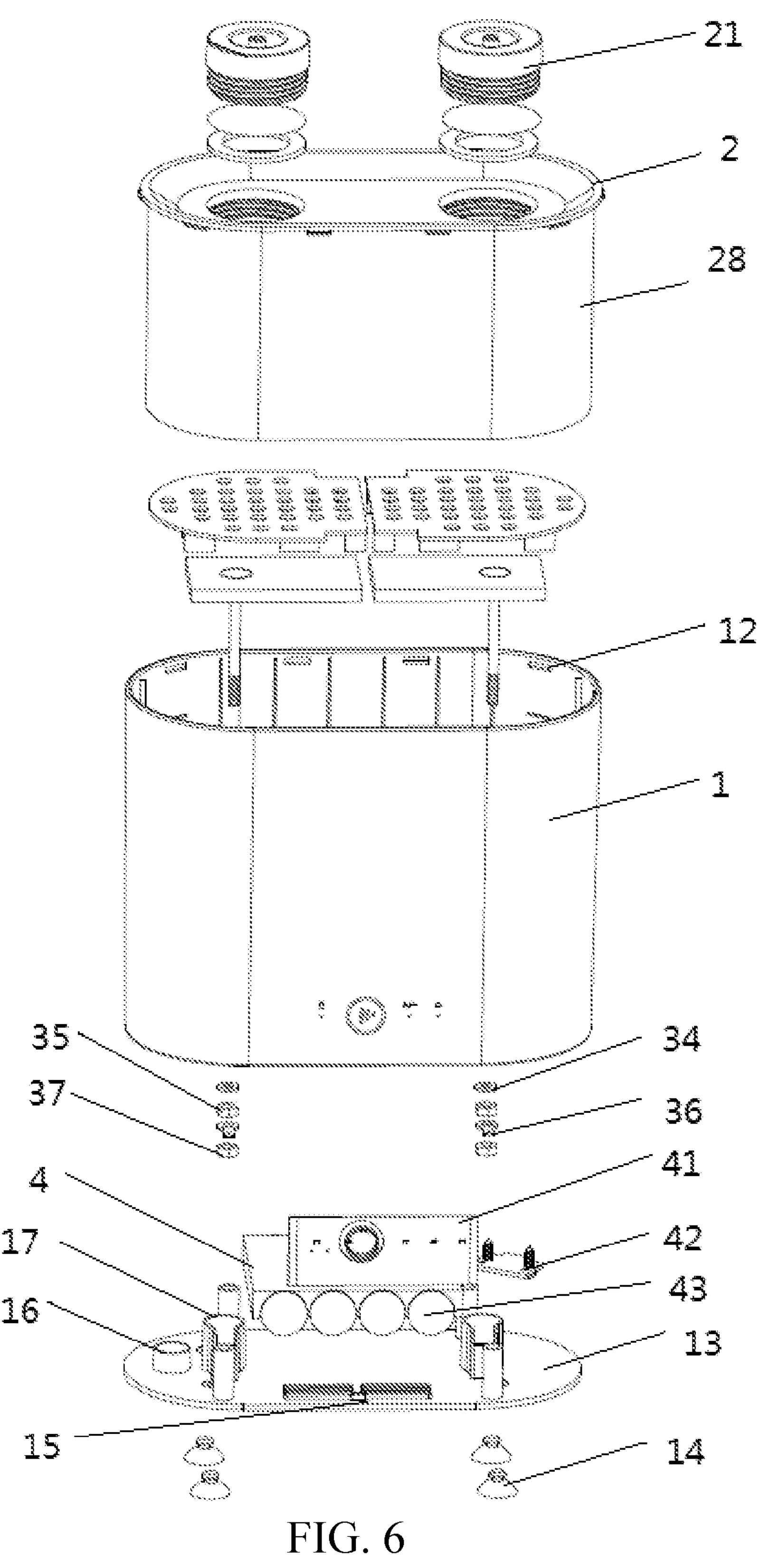
FIG. 6 is an overall exploded structural diagram of another portable hydrogen-oxygen generator of the present invention.

As shown in FIG. 6, another structure of the portable hydrogen-oxygen generator of the present invention is provided.

A housing 1 has a hollow barrel structure. The housing has an open upper opening and is snapped with the bottom cover 13 at the bottom, to hold and install the electrolytic cell module and the power supply module 3. The holding space in the housing 1 is effectively utilized by the electrolytic cell module and the power supply module 3. The electrolytic cell module is an independent structure storing the electrolyte, namely, the main body 28 of the electrolytic cell module. The main body 28 of the electrolytic cell module is integrated molding with the upper cover 2 of the electrolytic cell module or separated structure, and the bottom plate and the side wall of the main body 28 enclose a holding space for storing the electrolyte.

The electrolytic cell module is sleeved in the housing 1 for storing the electrolyte. The edge of the upper cover 2 of the electrolytic cell module is provided with a plurality of bulges 25 matching with the location holes 12 arranged at the upper end of the inner wall of the housing 1 to clamp and fix the electrolytic cell module.

The electrolytic cell module has a hydrogen generation chamber and an oxygen generation chamber which are mutually independent, and the cathode electrode plate and the anode electrode plate are respectively arranged in the hydrogen generation chamber and the oxygen generation chamber. The bottoms of the two generation chambers are communicated with a channel for electrolyte circulation. The communicated bottoms may allow the electrolyte to flow freely.

The upper cover 2 of the electrolytic cell module is detachably provided with a hydrogen outlet part 21 and an oxygen outlet part 22 and respectively corresponding to the hydrogen generation chamber and the oxygen generation chamber. The detachable way may be thread rotation connection, expanded connection, or other pluggable methods and the like. A filtering film 23 for removing water is also arranged between the hydrogen/oxygen outlet part and the electrolytic cell module. The filtering film 23 is welded at the lower end of the hydrogen/oxygen outlet part, and a sealing gasket 24 for sealing is also arranged between the hydrogen/oxygen outlet part and the opening of the upper cover 2.

As shown in FIG. 6, the cathode electrode plate and the anode electrode plate are also provided with hole-shaped electrode cover plates 31 to prevent the electrodes from swinging. The electrode cover plate 31 is clamped and fixed with the matching structure protruding from the partition through the snaps 33 at its side.

The cathode electrode plate and the anode electrode plate are respectively fixed on the bottom cover 13 at the bottom of the housing 1 through screw rods 32. The screw rod 32, first passing through the bottom cover of the electrolytic cell module and successively passing through the gasket 34, the first screw 35 for fixing the electrode, the binding post 36 and the second screw 37 for fixing the binding post 36, is fixed in the bottom cover fixing hole 18 of the bottom cover 13. The binding post 36 is electrically connected with the circuit board 42 of the power supply module 4 through electric wires.

The power supply module 4 is arranged on the bottom cover 13 of the housing 1 to supply electric energy for the cathode electrode plate and the anode electrode plate. The power supply module 4 includes a control part 41, a circuit board 42 and a battery pack 43. The control part 41 can control the on-off of the generator and other conventional adjustment operations. The portable hydrogen-oxygen generator is also provided with a liquid level sensor 16. A control component of liquid level sensor 16 is arranged on the bottom cover 13, and a probe of that is arranged in the electrolytic cell module. When the electrolyte reaches a low liquid level, a buzzer sounds to remind to add electrolyte, where the electrolyte is added by unscrewing a cover of the hydrogen outlet part 21 or the oxygen outlet part 22. When the electrolyte reaches a high liquid level, the buzzer sounds to remind to stop adding electrolyte.

The bottom cover 13 is also provided with heat emission holes 15, and the bottom of the bottom cover 13 is also provided with suction cups 14 for preventing shaking.

At last, it should be noted that the above various embodiments are merely intended to illustrate the technical solution of the present disclosure and not to limit the same; although the present disclosure has been described in detail with reference to the foregoing embodiments, it should be understood by those ordinary skilled in the art that the technical solutions described in the foregoing embodiments can be modified or equivalents can be substituted for some or all of the technical features thereof; and the modification or substitution does not make the essence of the corresponding technical solution deviate from the scope of the technical solution of each embodiment of the present disclosure.

The invention claimed is:

1. A portable hydrogen-oxygen generator, comprising:

a housing having a hollow columnar structure with a holding space, wherein the housing is provided with a detachable upper cover at an upper end, is snapped with a bottom cover at an bottom, and internally provided with a horizontally partition that separates the housing into an electrolytic cell module and a power supply module, wherein the electrolytic cell module comprises a hydrogen generation chamber and an oxygen generation chamber having a vertical partition disposed therebetween, wherein a cathode electrode plate and an anode electrode plate are horizontally disposed in the hydrogen generation chamber and the oxygen generation chamber, respectively, wherein the vertical partition and the horizontal partition has a gap in between so that the hydrogen generation chamber and the oxygen generation chamber are in fluid communication;

a hydrogen outlet and an oxygen outlet detachably arranged on the upper cover and are disposed above the hydrogen generation chamber and the oxygen generation chamber, respectively, a filtering film is disposed between each of the hydrogen outlet and the oxygen outlet and the electrolytic cell module; and the power supply module comprising a power source detachably affixed to the bottom cover of the housing, configured to supply electric energy to the cathode electrode plate and the anode electrode plate during operation, wherein each of the cathode electrode plate and the anode electrode plate has a perforated cover plate attached to an upper surface thereof and a screw rod extending downwardly therefrom, and each perforate cover plate has a plurality of snaps for fastening to the horizontal partition.

2. The portable hydrogen-oxygen generator according to claim 1, wherein the portable hydrogen-oxygen generator is provided with a liquid level sensor, a control component thereof is arranged on the bottom cover and a probe thereof is arranged in the electrolytic cell module.

3. The portable hydrogen-oxygen generator according to claim 2, when the electrolyte reaches a predetermined low liquid level, a buzzer sounds to remind to add electrolyte, wherein the electrolyte is added by unscrewing a cover of the hydrogen outlet part or the oxygen outlet part; and when the electrolyte reaches a predetermined high liquid level, the buzzer sounds to remind to stop adding electrolyte.

4. The portable hydrogen-oxygen generator according to claim 1, wherein an edge of the upper cover is provided with a plurality of bulges that match a plurality of holes arranged at an upper end of inner wall of the housing for affixing the electrolytic cell module to the housing.

5. The portable hydrogen-oxygen generator according to claim 1, wherein each of the screw rod of the cathode electrode plate and the screw rod the anode electrode plate extends through the horizontal partition and is affixed to the bottom cover of the housing, and is electrically connected with a circuit board of the power supply module.

6. The portable hydrogen-oxygen generator according to claim 5, wherein the bottom cover is provided with heat emission holes and a plurality of suction cups.

7. The portable hydrogen-oxygen generator according to claim 5, wherein each screw rod, successively extends through the horizontal partition, a gasket, a first screw for fixing the electrode, a binding post, and a second screw for fixing the binding post, is affixed in a fixing hole of the bottom cover.

* * * * *